(12) United States Patent
Lika

(10) Patent No.: US 11,906,032 B2
(45) Date of Patent: Feb. 20, 2024

(54) OIL MODULE

(71) Applicant: Mahle International GmbH, Stuttgart (DE)

(72) Inventor: Torsten Lika, Stuttgart (DE)

(73) Assignee: Mahle International GmbH (DE)

( * ) Notice: Subject to any disclaimer, the term of this patent is extended or adjusted under 35 U.S.C. 154(b) by 115 days.

(21) Appl. No.: 17/553,796

(22) Filed: Dec. 17, 2021

(65) Prior Publication Data

US 2022/0196140 A1 Jun. 23, 2022

(30) Foreign Application Priority Data

Dec. 18, 2020 (DE) .......................... 102020216288.3

(51) Int. Cl.
*F16H 57/04* (2010.01)
*H02K 9/193* (2006.01)

(52) U.S. Cl.
CPC ..... *F16H 57/0417* (2013.01); *F16H 57/0436* (2013.01); *F16H 57/0476* (2013.01); *H02K 9/193* (2013.01)

(58) Field of Classification Search
CPC .. F16H 57/0441; F16H 57/0417; H02K 9/193
See application file for complete search history.

(56) References Cited

U.S. PATENT DOCUMENTS 3,223,197 A * 12/1965 Conover ................ F01M 11/03
184/6.28
4,324,213 A * 4/1982 Kasting .................... F01M 1/10
184/6.22
6,182,616 B1 * 2/2001 Itoh ........................ F01M 11/03
123/41.1
6,941,922 B2 * 9/2005 Williams ............... F01M 5/005
123/196 R
8,375,917 B1 * 2/2013 Neal ...................... F01M 11/03
123/196 AB
(Continued)

FOREIGN PATENT DOCUMENTS

DE    102008032816 A1    1/2010
DE    102009041525 A1    3/2011
DE    102018221052 A1    6/2020

OTHER PUBLICATIONS

DE102009041525—Machine translation (Year: 2009).*
(Continued)

*Primary Examiner* — Michael A Riegelman
(74) *Attorney, Agent, or Firm* — Fishman Stewart PLLC

(57) ABSTRACT

An oil module may include a conveying device for conveying oil along a flow path, a heat exchanger for temperature-controlling the oil, and a main body having a front side and a back side. The front side may include (i) an inlet opening and (ii) an outlet opening. The back side may include (i) at least one pump opening fluidically connected with the inlet opening, (ii) a first cooler opening fluidically connected with the at least one pump opening, and (iii) a second cooler opening fluidically connected with the outlet opening. The conveying device may be arranged on the back side and fluidically connected with the at least one pump opening. The heat exchanger may be arranged on the back side and fluidically connected with the first cooler opening and the second cooler opening.

20 Claims, 4 Drawing Sheets

(56) References Cited

U.S. PATENT DOCUMENTS

| | | | |
|---|---|---|---|
| 8,887,688 B1* | 11/2014 | Neal | F01M 1/10 |
| | | | 123/196 R |
| 9,458,967 B2* | 10/2016 | Leising | F04D 29/06 |
| 9,512,752 B2* | 12/2016 | Czechowski | F16N 39/06 |
| 9,528,594 B2* | 12/2016 | Konruff | F16H 57/0435 |
| 2008/0006229 A1* | 1/2008 | Wilmink | F01P 7/16 |
| | | | 123/196 AB |
| 2011/0186273 A1* | 8/2011 | Gruner | F01M 11/03 |
| | | | 165/164 |
| 2015/0184802 A1* | 7/2015 | Leising | F16N 39/02 |
| | | | 184/6.22 |
| 2022/0196140 A1* | 6/2022 | Lika | F16H 57/0417 |

OTHER PUBLICATIONS

English abstract for DE-102009041525.
English abstract for DE-102018221052.
German Search Report for DE-102020216288.3, dated Jul. 23, 2021.

* cited by examiner

OIL MODULE

CROSS-REFERENCE TO RELATED APPLICATIONS

This application claims priority to German Patent Application No. DE 10 2020 216 288.3, filed on Dec. 18, 2020, the contents of which is hereby incorporated by reference in its entirety.

TECHNICAL FIELD

The present invention relates to an oil module, in particular to a gear oil module, which is employed for example for an electric motor and comprises a conveying device and a heat exchanger. Furthermore, the invention relates to a system having a motor, in particular an electric motor, and such an oil module. Furthermore, the invention relates to a main body for such an oil module.

BACKGROUND

During the operation of a multiplicity of applications, an oil supply, for example for lubricating and/or cooling, is necessary. Such an application is for example a motor, in particular an electric motor, whose gear is supplied with oil. The supply with oil requires the provision of a conveying device, for example an oil pump, which during the operation conveys the oil along a flow path. Generally, it is designed, furthermore, to temperature-control, in particular to cool, the oil when required. For this purpose, a heat exchanger is generally employed which, for temperature-controlling, in particular cooling, of the oil is flowed through by the oil. In principle, the conveying device and the heat exchanger can each be attached separately to the associated application, in particular to the motor. However, this requires separate connections on the motor in each case and results in a more complex assembly and thus production of a system with the motor and the conveying device as well as the heat exchanger.

It is therefore conceivable to combine components of the oil supply, i.e. for example the conveying device and the heat exchanger, in a module which as such is attached to the associated application and is fluidically connected to the application. This requires fewer assembly steps during the assembly of the module and, furthermore, allows a prefabrication of the module.

Such modules, in the following also referred to as oil modules, usually comprise a collecting space for oil, also known as oil pan. The oil pan serves for the purpose of collecting oil incurred during the operation and to again feed the said oil to the flow path if applicable. This requires that the oil pan, in the mounted state, forms the lowest point with respect to the vertical direction. As a consequence, both the necessary installation space and also the possible mounting options of the oil module on the associated application, in particular on the motor, are reduced.

SUMMARY

The present invention therefore deals with the object of stating, for an oil module of the type mentioned above and for a system having a motor and such an oil module and for a main body for such an oil module, improved or at least other embodiments which are characterised by a more variable mounting possibility and/or a reduced installation space requirement.

According to the invention, this object is solved through the subject matter of the independent claim(s). Advantageous embodiments are the subject matter of the dependent claim(s).

The present invention is based on the general idea of providing a main body for an oil module, which on a front side provided for attaching to an associated application, in particular to a motor, comprises openings for the fluidic connection with the application and on a back side facing away from the front side, openings for the fluidic connection of components of the oil module, wherein the openings are at least partly fluidically interconnected within the main body, so that the main body, besides the attachment to the application and to the components, also serves for the fluidic connection between the application and the components. In this way, a compact and simple design of the oil module ensues, wherein in addition external fluidic connections are not required or at least substantially reduced in their number. Through the omission of a so-called oil pan there arises at the same time the necessity of attaching the oil module to the associated application in a predetermined orientation. As a consequence, the production of the oil module is simplified and the mounting of the oil module to the associated application simpler with an increased variability of the mounting possibilities.

According to the inventive idea, the oil module, besides the main body, comprises a conveying device and a heat exchanger. The conveying device, which can be designed for example as an oil pump, serves the purpose of conveying the oil during the operation. This means that the conveying device, during the operation, conveys oil along a flow path. The heat exchanger serves the purpose of temperature-controlling, in particular of cooling, the oil. For this purpose, the flow path, for temperature-controlling the oil, leads through the heat exchanger. The main body comprises a front side and a back side facing away from the front side. On the front side, an inlet opening for letting oil into the main body and an outlet opening for letting oil out of the main body are formed. Thus, fluidic connections of the oil module with an associated application, for example with a motor, can be realised on the same side. On the back side of the main body at least one pump opening for the conveying device is provided. Here, the at least one pump opening in the main body is fluidically connected with the inlet opening. Further, two cooler openings for the heat exchanger, in the following also referred to as first cooler opening and second cooler opening, are formed on the back side spaced apart from the at least one pump opening. The first cooler opening in the main body is fluidically connected with at least one of the at least one pump opening, advantageously fluidically connected with one of the at least one pump opening. Compared with this, the second cooler opening in the main body is fluidically connected with the outlet opening. The conveying device and the heat exchanger are each arranged on the back side of the main body. The conveying device is fluidically connected with the at least one pump opening, so that the flow path leads between the inlet opening and the conveying device. The heat exchanger is fluidically connected with the cooler openings so that the flow path leads through the heat exchanger between the cooler openings and between the second cooler opening and the outlet opening.

Practically, the main body forms the connection base of the oil module for connecting the oil module to the associated application, in particular to a motor. For the application, a motor is uniformly mentioned here in the following, wherein it is to be understood that other applications are also included.

Practically, the main body is designed contiguously and integrally. This means that the main body preferably does not comprise any component parts that are separate from one another.

Preferred are embodiments, in which the main body can be designed elongated, in particular in the manner of a plate, which can be formed stepped. This leads to a simplified mounting of the oil module to the motor and further to a reduced installation space requirement. The plate-like design of the main body is provided in that the main body, in the distance direction of the back side to the front side, is maximally half the size as transversely to the distance direction. Preferably, the main body, in the distance direction of the back side to the front side, is maximally a quarter, particularly preferably maximally an eighth the size as transversely to the distance direction.

Practically, the cooler openings within the main body are fluidically separated from one another and fluidically connected to one another via the heat exchanger. This means that the flow path, by means of the cooler openings, leads through the heat exchanger and the heat exchanger thus fluidically interconnects the cooler openings.

In preferred embodiments, the conveying device and/or the heat exchanger are attached to the main body. It is particularly preferred when the conveying device and the heat exchanger are fastened to the back side of the main body.

The inlet opening and the outlet opening are advantageously spaced apart from one another. This makes possible in particular an advantageous fluid conduction both in the oil module and also in the motor.

In an advantageous further development of the solution according to the invention, a further opening that is fluidically connected with at least one of the abovementioned openings in the main body is provided for providing a component of the oil module in addition to the conveying device and the heat exchanger. This means that the main body comprises at least one component opening that is spaced apart from the front side and separate from the at least one pump opening and from the cooler openings, which in the main body is fluidically connected with at least one of the cooler openings and/or with at least one of the at least one pump opening. Here, an additional component of the oil module that is separate from the conveying device and from the heat exchanger is fluidically connected with at least one associated or at least one component opening and arranged spaced apart from the front side. Particularly preferably, the additional component is attached to the main body.

The additional component is any component which serves for the operation and/or the controlling and/or regulating of the operation of the oil module or of the motor. In particular, the respective additional component can be an oil filter for filtering the oil or a sensor device for determining a state variable, for example the temperature of the oil.

It is conceivable that at least one of the at least one component opening is formed on the back side of the main body.

Embodiments are also conceivable in which at least one of the at least one component opening is arranged laterally regarding the front side and back side. This means that the main body comprises outer sides connecting the front side with the back side, wherein at least one of the at least one component opening is formed on one of the outer sides.

In principle, the flow path between the conveying device and the heat exchanger can run in any orientation. This means that the conveying device can be arranged upstream or downstream of the heat exchanger.

Advantageously, the conveying device is arranged upstream of the heat exchanger. This means that the flow path leads from the inlet opening via the at least one pump opening to the conveying device, from the at least one pump opening to the first cooler opening and subsequently via the heat exchanger through the second cooler opening to the outlet opening. This results in that the heat exchanger is arranged on the pressure side of the conveying device. In this way, an improved temperature-control, in particular an improved cooling, of the oil is possible so that the efficiency is increased.

In principle, the main body can be formed as a flat and shallow plate, in which corresponding fluidic conduits for connecting the fluidically interconnected openings are formed.

It is likewise conceivable to form the main body with a base plate and components having different orientations with respect to the base plate. Advantageously, the base plate serves for the fluidic connection and attachment of the heat exchanger. This means that the base plate comprises the cooler openings.

It is conceivable that the main body comprises an ancillary plate, which serves for fluidically connecting with the conveying device and thus comprises the at least one pump opening. Preferably, the ancillary plate also comprises the inlet opening. This leads to a simplified design of the main body and shortened fluidic connections within the main body.

It is preferred when the ancillary plate is offset relative to the base plate in the distance direction of the back side to the front side, towards the front side, so that the front side and the back side of the ancillary plate are arranged offset to the front side and back side of the base plate. In other words, the front side and the back side of the ancillary plate are offset towards the motor in the associated system.

Conceivable are embodiments, in which the main body comprises an arm projecting from the base plate transversely or obliquely to the distance direction of the back side to the front side. The arm serves for the fluidic connection of the oil module with the motor. Accordingly, the outlet opening is at least partly formed on the arm. Thus it is possible in particular to form the outlet opening larger and thus establish an improved fluidic connection between the oil module and the motor.

The oil module can be formed in particular as a gear oil module which serves for the supply with oil of a gear, in particular of a motor, for example of an electric motor.

It is to be understood that the main body as such is also included in the scope of this invention.

Advantageously, the oil module is part of a system which additionally comprises the motor. Here it is to be understood that such a system is also part of the scope of this invention.

The oil module is advantageously attached to the motor, in particular fastened. This practically takes place in such a manner that the front side of the main body faces the motor, whereas the back side faces away from the motor. Advantageously, the front side of the main body is supported on the motor. The motor practically comprises an oil inlet for letting oil into the motor and an oil outlet for letting oil out of the motor, which each face the front side. Here, the oil outlet is fluidically connected with the inlet opening and the oil inlet fluidically connected with the outlet opening of the oil module. As a consequence, the flow path leads through the motor. In particular, the gear of the motor is thus supplied with oil.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

A preferred exemplary embodiment of the invention is shown in the drawings and is explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
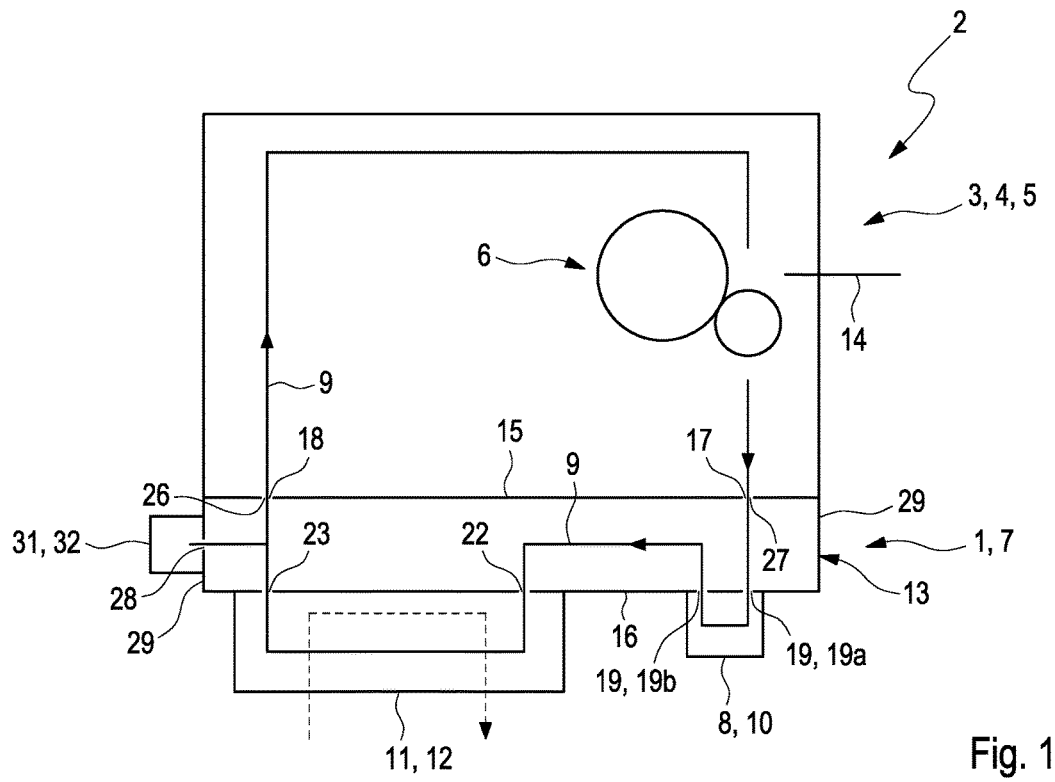
FIG. 1 shows a greatly simplified representation of a system having a motor and an oil module in the manner of a circuit diagram.
Figure 2:
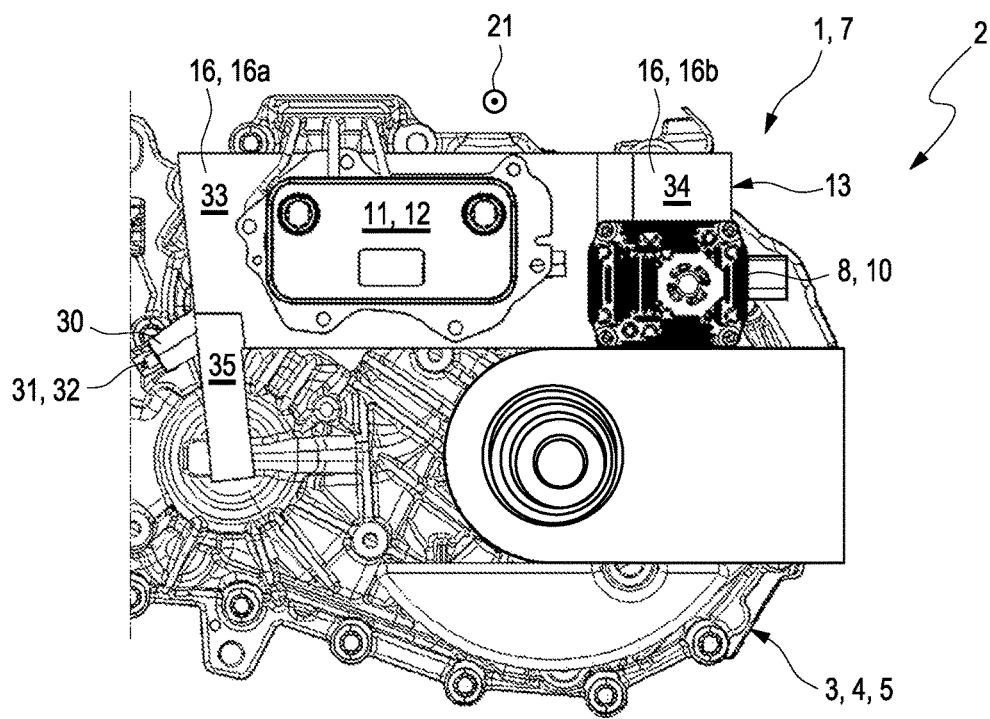
FIG. 2 shows a lateral view of the system.
Figure 3:
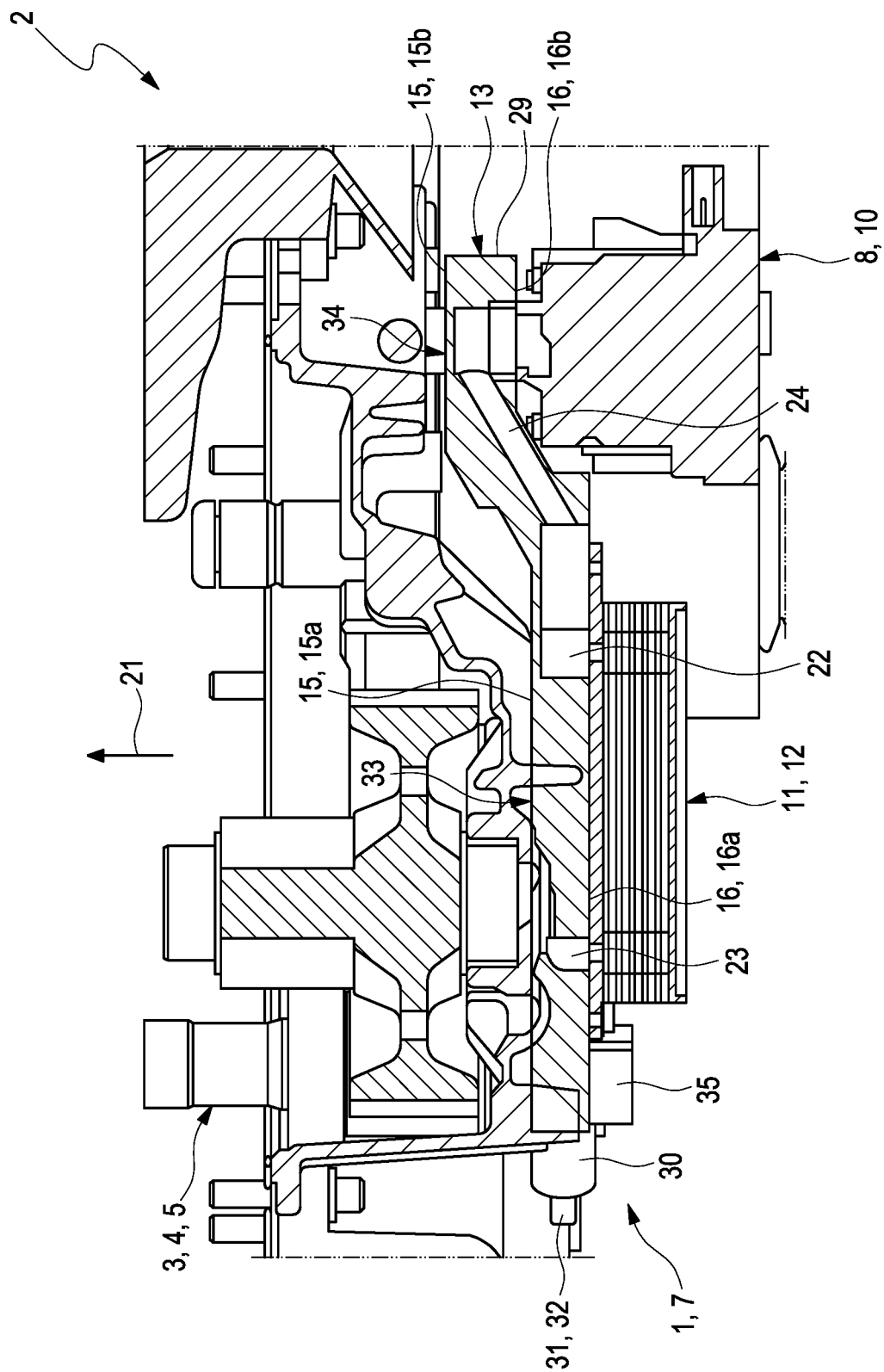
FIG. 3 shows a section through the system.

An oil module 1, as shown for example in the FIGS. 1 to 7, is employed in a system 2 shown in the FIGS. 1 to 3, in order to supply an associated application 3 with oil. In the shown system 2, the application 3 is a motor 4, in particular an electric motor 5. As is evident from FIG. 1, the motor 4 comprises a gear 6. Here, as indicated in FIG. 1, the oil module 1 can be employed for supplying the gear 6 with oil and accordingly be a gear oil module 7. As indicated in FIG. 1, the motor 4, in particular the electric motor 5, comprises a shaft 14 via which a torque can be drawn on the motor 4.

The oil module 1 comprises a conveying device 8 for conveying the oil along a flow path 9 (see in particular FIG. 1), which is designed in particular as an oil pump 10. For the temperature-controlling, in particular for the cooling of the oil, the oil module 1 further includes a heat exchanger 11, in particular an oil cooler 12. For the temperature-controlling, in particular for the cooling of the oil, the flow path 9 leads through the heat exchanger 11. The heat exchanger 11 shown in the figures is, separated from the flow path 9 of the oil, flowed through by a temperature-control means, for example by a coolant, whose flow in FIG. 1 is indicated with a dashed line.

Figure 4:
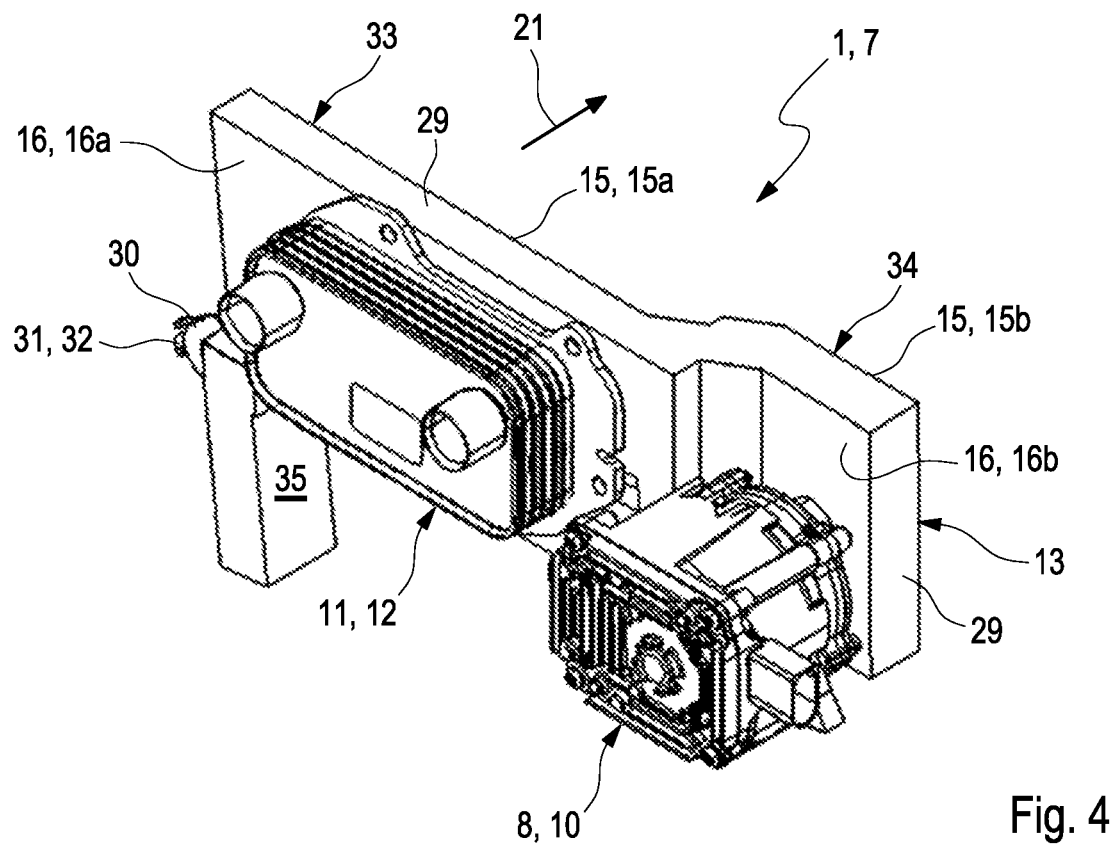
FIG. 4 shows an isometric view of the oil module towards a back side of the oil module.

The oil module 1 furthermore includes a main body 13. The main body 13 is formed plate-like and comprises a front side 15, which faces the motor 4, and a back side 17 facing away from the front side 15, which consequently faces away from the motor 4. Here, FIG. 4 shows an isometric view of the oil module 1 towards the back side, FIG. 5 an isometric view of the main body 13 towards the back side 16, FIG. 6 an isometric view of the oil module 1 towards the front side 15 and FIG. 7 a front view towards the front side 15, wherein the main body 13 is shown in a transparent manner. The main body 13 further comprises outer sides 29 connecting the front side 15 with the back side 16.

Figure 5:
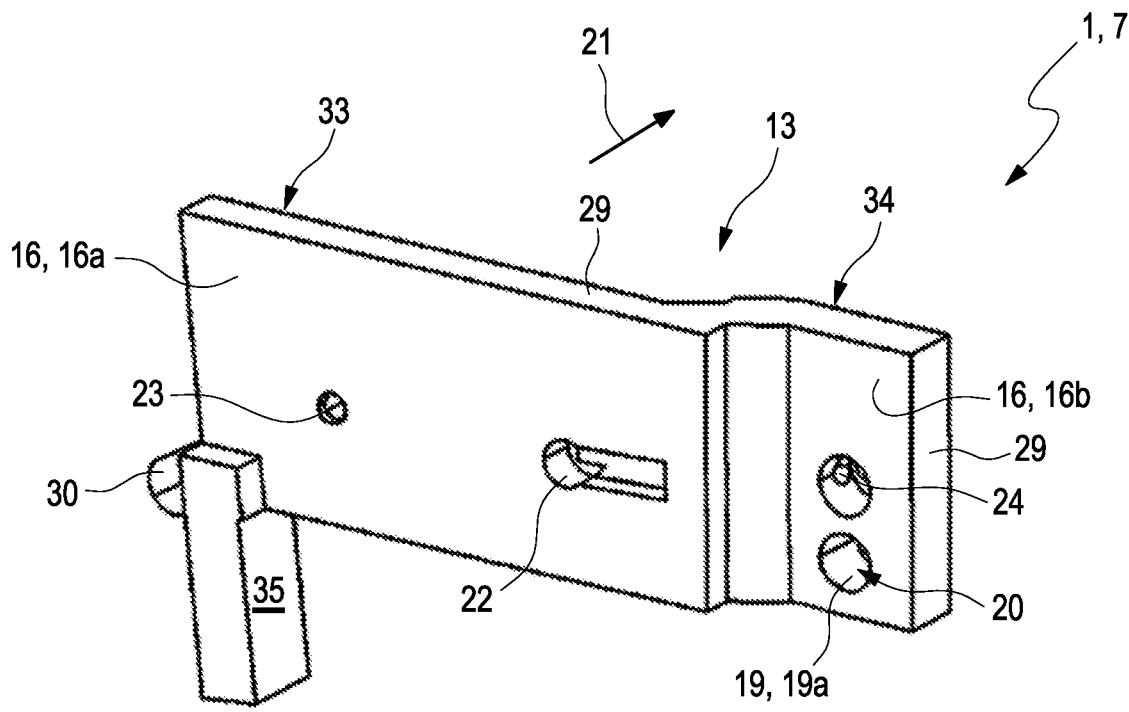
FIG. 5 shows an isometric view of a main body of the oil module towards the back side.
Figure 6:
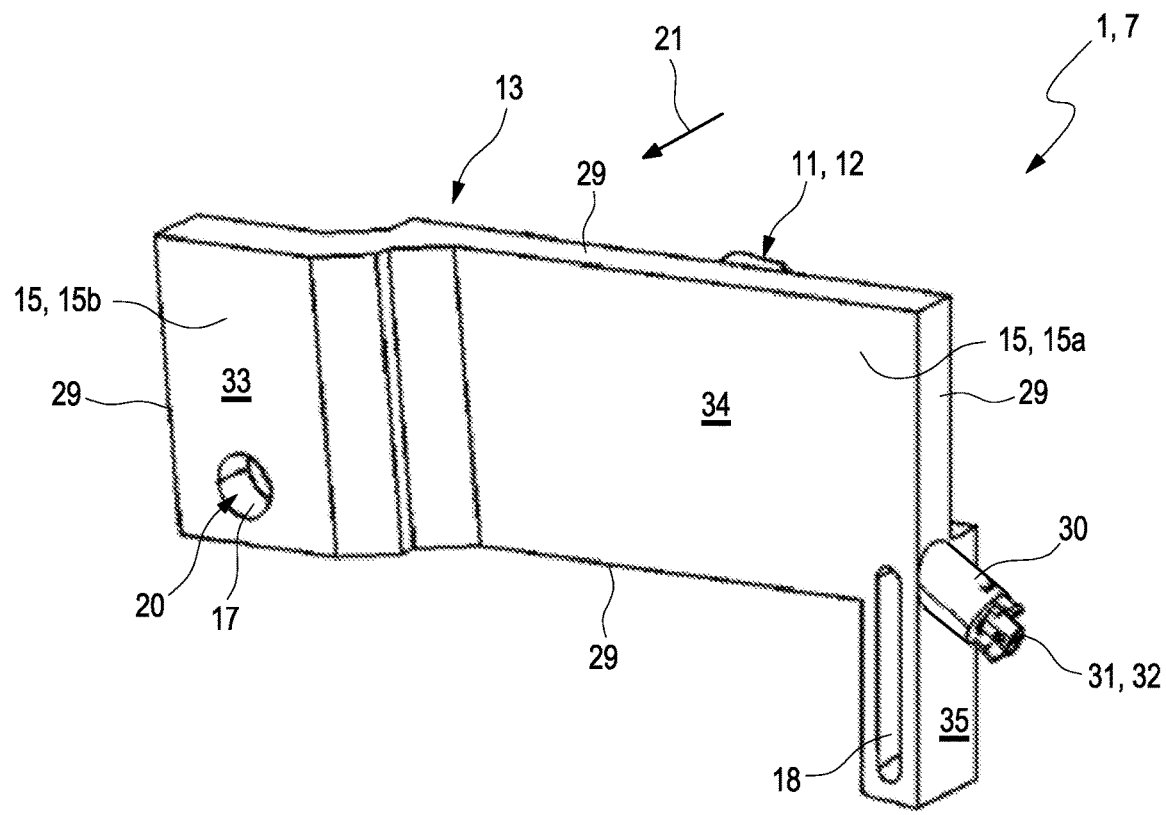
FIG. 6 shows an isometric view of the oil module towards a front side.

As is evident in particular from the FIGS. 1 and 6, the main body 13 comprises an inlet opening 17 and an outlet opening 18 spaced apart from the inlet opening 17, which are each formed on the front side 15. In the exemplary embodiment shown in the FIGS. 2 to 7, the inlet opening 17 is formed round and the outlet opening 18 elongated.

As is evident in particular from the FIGS. 1 and 5, the main body 13 on the back side 16 comprises at least one pump opening 19, in the shown exemplary embodiment 2 pump openings 19 spaced apart from one another. The pump openings 19 serve for the fluidic connection with the conveying device 8, which are arranged on the back side 16 and attached to the main body 13. Here, at least one of the at least one pump opening 19 in the main body 13 is fluidically connected with the inlet opening 17. In the shown exemplary embodiment, a first one of the pump openings 19a is fluidically connected with the inlet opening 17 by a channel 20 running through the main body 13, wherein this channel 20 in the following is also referred to as pump channel 20. The pump channel 20 of the shown exemplary embodiment runs along a distance direction 21 of the back side 16 to the front side 15. As is evident in particular from the FIGS. 1 and 5, the main body 13 comprises, on the back side 16 and spaced apart from the at least one pump opening 19, two cooler openings 22, 23, namely a first cooler opening 22 and a second cooler opening 23. The first cooler opening 22 in the shown exemplary embodiment is arranged nearer to the pump openings 19 than the second cooler opening 23. As is evident in particular from the FIGS. 1 and 3, the second pump opening 19b in the main body 13 is fluidically connected with the first cooler opening 22. For this purpose, a channel 24 runs between the second pump opening 19b and the first cooler opening 22, wherein this channel 24 in the following is also referred to as cooler channel 24. The heat exchanger 11 is fluidically connected with both cooler openings 22, 23 in such a manner that the cooler openings 22, 23 are fluidically connected to one another via the heat exchanger 11. In the shown exemplary embodiment, a fluidic connection between the cooler openings 22, 23 ensues exclusively via the heat exchanger 11. Furthermore, the second cooler opening 23 in the main body 13, as is evident in particular in FIG. 1, is fluidically connected with the outlet opening 18. For this purpose a channel 25, which in the following is also referred to as outlet channel 25, runs between the second cooler opening 23 and the outlet opening 18.

Thus, the flow path 9 runs between the inlet opening 17 and the first pump opening 19a via the pump channel 20, between the second pump opening 19b and the first cooler opening 22 via the cooler channel 24, between the first cooler opening 22 and the second cooler opening 23 via the heat exchanger 11 and between the second cooler opening 23 and the outlet opening 18 via the outlet channel 25. In the shown exemplary embodiment, the conveying device 8 is operated in such a manner that it is arranged upstream of the heat exchanger 11. Thus, the flow path 9 leads via the inlet opening 17 into the oil module 1, via the pump channel 20 to the first pump opening 19a and via the first pump opening 19a into the conveying device 8, wherein the conveying device 8 outputs the conveyed oil via the second pump opening 19b, so that the flow path 9 leads from the second pump opening 19b via the cooler channel 24 to the first cooler opening 22 and via the heat exchanger 11 to the second cooler opening 23 and from the second cooler opening 23 via the outlet channel 25 to the outlet opening 18.

For fluidically connecting the oil module 1 with the motor 4, the motor 4, facing the front side 15, comprises an oil inlet 26 and an oil outlet 27 for the letting out oil as is evident in FIG. 1. In the system 2 and thus in the state of the oil module 1 mounted on the motor 4, the oil inlet 26 is congruent with the outlet opening 18 and fluidically connected with the outlet opening 18. Compared with this, the oil outlet 27 is congruent with the inlet opening 17 and fluidically connected with the inlet opening 17. Accordingly, the oil enters the motor 4 via the outlet opening 18 and the oil inlet 26 and the oil module 1 via the oil outlet 27 and the inlet opening 17.

Thus, an oil module 1 and a system 2 are realised which are configured in an installation space-saving manner. In addition, the oil module 1 can be attached to the motor 4 in different positions and orientations, for example both vertically and also horizontally. The reason for this is in particular that the oil module 1 does not comprise an oil pan for collecting oil.

In the shown exemplary embodiment, the main body 13, spaced apart from the front side 15, comprises at least one further opening 28, which in the following is also referred to as component opening 28. Thus, the component opening 28 is spaced apart from the front side 15 and thus spaced apart both from the inlet opening 17 and also from the outlet opening 18. In addition to this, the component opening 28 is separate from the at least one pump opening 19 and from the cooler openings 22, 23, and spaced apart from these. In the shown exemplary embodiment, merely one component opening 28 is purely exemplarily provided, which is formed on one of the outer sides 29. As is evident in particular from the FIGS. 2 to 7, the component opening 28 of the shown exemplary embodiment is fluidically connected to the outside via a receiving channel 30, wherein the receiving channel 30 runs obliquely to the distance direction 21. The component opening 28 serves for the fluidic connection of a further component 31 of the oil module 1, which is separate from the conveying device 8 and the heat exchanger 11, which in the following is also referred to as additional component 31. In the shown exemplary embodiment, the additional component 31 is a sensor device 32, which, via the component opening 28, is fluidically connected with the flow path 9 and during the operation determines a state variable of the oil, in particular the temperature of the oil.

As is evident in particular from the FIGS. 3 to 7, the main body 13 of the shown exemplary embodiment comprises a base plate 33, which comprises the cooler openings 22, 23. The base plate 33 thus comprises a portion of the back side 16, which in the following is also referred to as back side 16a of the base plate 33. On the back side 16a of the base plate 33, the cooler openings 22, 23 are formed. Analogously to this, the base plate 33 comprises a portion of the front side 15 of the main body 13, which in the following is also referred to as front side 15a of the base plate 33. The main body 13 of the shown exemplary embodiment further comprises an ancillary plate 34 connected with the base plate 33 step-like, which comprises the inlet opening 17 and the pump openings 19. Thus, the ancillary plate 34 comprises a portion of the back side 16 of the main body 13, which in the following is also referred to as back side 16b of the ancillary plate 34. Here, the pump openings 19 are formed on the back side 16b of the ancillary plate 34. In addition, the ancillary plate 34 comprises the inlet opening 17. Thus, the ancillary plate 34 comprises a portion of the front side 15 of the main body 13, which in the following is also referred to as front side 15b of the ancillary plate 34. Here, the inlet opening 17 is formed on the front side 15b of the ancillary plate 34. As is evident in the figures, the ancillary plate 34 is moved here towards the base plate 33 in the distance direction 21. This means that the ancillary plate 34, compared with the base plate 33, is arranged offset towards the motor 4. As a consequence, the front side 15a and the back side 16a of the base plate 33 are offset towards the front side 15b and back side 16b of the ancillary plate 34 in the distance direction 21.

Figure 7:
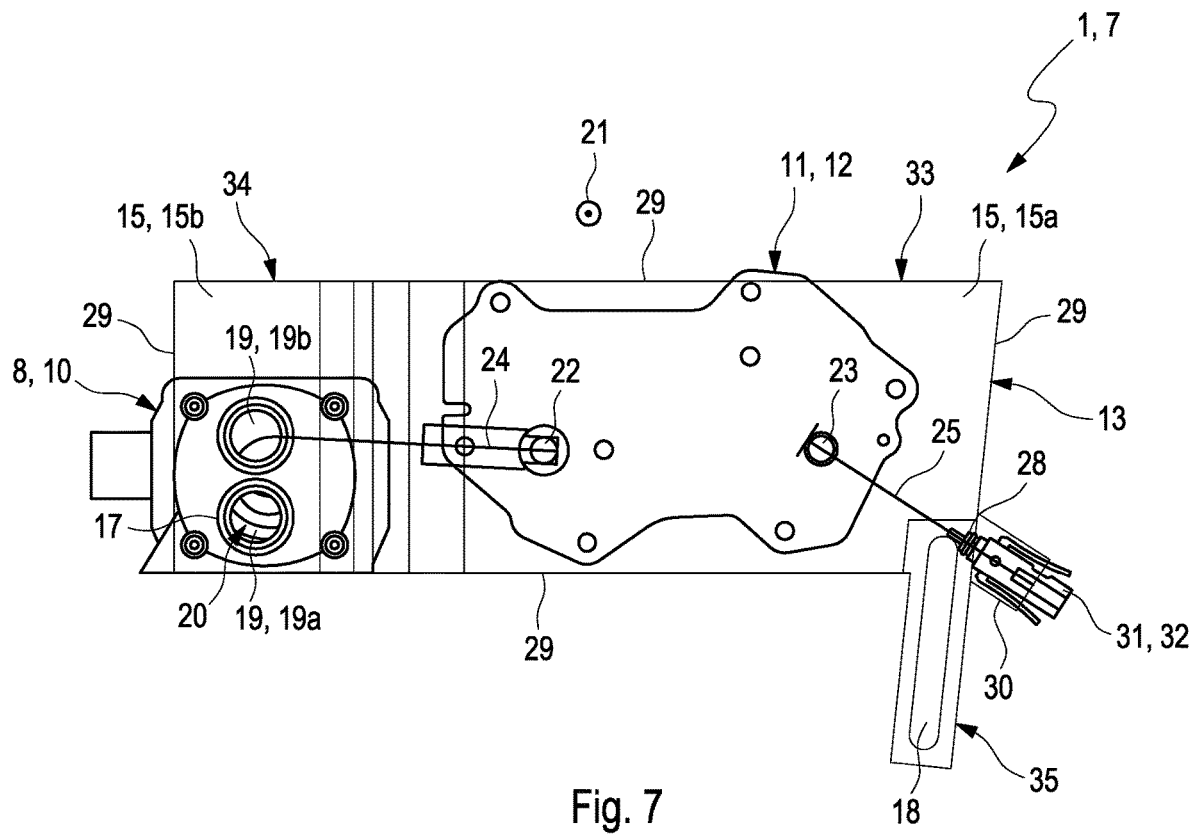
FIG. 7 shows a front view of the front side of the oil module with transparent main body.

As is evident in particular from FIG. 6 and FIG. 7, the main body 13, in the shown exemplary embodiment, additionally comprises an arm 35. The arm 35 is arranged spaced apart from the ancillary plate 34 and projecting from the base plate 33 and comprises the outlet opening 18 at least partially.

The invention claimed is:
1. An oil module, comprising:
a conveyor which during operation conveys oil along a flow path;
a heat exchanger for temperature-controlling the oil, the flow path extending through the heat exchanger;
a main body having a front side and a back side facing away from the front side;
the front side including (i) an inlet opening for letting oil into the main body and (ii) an outlet opening for letting oil out of the main body;
the back side including at least one pump opening fluidically connected with the inlet opening;
the back side further including, disposed spaced apart from the at least one pump opening, a first cooler opening and a second cooler opening;
the first cooler opening fluidically connected with the at least one pump opening;
the second cooler opening fluidically connected with the outlet opening;
wherein the conveyor is arranged on the back side and fluidically connected with the main body via the at least one pump opening such that the flow path extends between the inlet opening and the conveyor and between the conveyor and the first cooler opening; and
wherein the heat exchanger is arranged on the back side and fluidically connected with the first cooler opening and the second cooler opening such that the flow path extends through the heat exchanger between the first cooler opening and the second cooler opening and between the second cooler opening and the outlet opening.
2. The oil module according to claim 1, wherein:
the main body further includes at least one component opening that is disposed spaced apart from the front side and separate from the at least one pump opening, the first cooler opening, and the second cooler opening, the at least one component opening, in the main body, fluidically connected with at least one of (i) the first cooler opening, (ii) the second cooler opening, and the at least one pump opening; and
an additional component that is separate from the conveyor and from the heat exchanger is fluidically connected with the at least one component opening and disposed spaced apart from the front side.
3. The oil module according to claim 2, wherein:
the main body has a plurality of outer sides connecting the front side with the back side; and
the at least one component opening is disposed in one of the plurality of outer sides.

4. The oil module according to claim 2, wherein the at least one additional component is a sensor configured to determine a state variable of the oil.

5. The oil module according to claim 1, wherein the conveyor is arranged along the flow path upstream of the heat exchanger.

6. The oil module according to claim 1, wherein the main body further includes a base plate, which includes the first cooler opening and the second cooler opening.

7. The oil module according to claim 6, wherein:
the main body further includes an ancillary plate, which includes the inlet opening and the at least one pump opening; and
the ancillary plate is arranged offset relative to the base plate in a distance direction of the back side to the front side towards the front side such that a front side and a back side of the ancillary plate are arranged offset towards a front side and a back side of the base plate.

8. The oil module according to claim 7, wherein:
the main body further includes an arm projecting from the base plate transversely to the distance direction; and
the outlet opening is at least partially formed on the arm.

9. A main body for the oil module according to claim 1.

10. The oil module according to claim 1, wherein:
the at least one pump opening includes a plurality of pump openings; and
the plurality of pump openings includes (i) a first pump opening via which the oil is flowable into the conveyor from the main body and (ii) a second pump opening via which oil is flowable into the main body from the conveyor.

11. The oil module according to claim 10, wherein:
the first pump opening is fluidically connected with the inlet opening; and
the second pump opening is fluidically connected with the first cooler opening.

12. The oil module according to claim 11, wherein:
the first pump opening is fluidically connected with the inlet opening via a pump channel extending through the main body; and
the second pump opening is fluidically connected with the first cooler opening via a cooler channel extending from the second pump opening to the first cooler opening.

13. The oil module according to claim 1, wherein the second cooler opening and the outlet opening are fluidically connected via an outlet channel extending between the second cooler opening and the outlet opening.

14. The oil module according to claim 1, wherein the first cooler opening and the second cooler opening are fluidically connected to one another exclusively via the heat exchanger.

15. The oil module according to claim 1, wherein:
the main body further includes a base plate having a base plate front side and a base plate back side, the base plate front side at least partially defining the front side of the main body, the base plate back side at least partially defining the back side of the main body;
the main body further includes an ancillary plate having an ancillary plate front side and an ancillary plate back side, the ancillary plate front side at least partially defining the front side of the main body, the ancillary plate back side at least partially defining the back side of the main body; and
the base plate and the ancillary plate are connected to one another in a step-like manner such that the base plate and the ancillary plate are disposed offset from one another.

16. A system, comprising:
a motor including a gear; and
an oil module attached to the motor, the oil module including:
a conveyor which during operation conveys oil along a flow path;
a heat exchanger for temperature-controlling the oil, the flow path extending through the heat exchanger;
a main body having a front side and a back side facing away from the front side;
the front side including (i) an inlet opening for letting oil into the main body and (ii) an outlet opening for letting oil out of the main body;
the back side including a plurality of pump openings, the plurality of pump openings including (i) a first pump opening via which the oil is flowable into the conveyor from the main body and (ii) a second pump opening via which oil is flowable into the main body from the conveyor;
the back side further including, disposed spaced apart from the plurality of pump openings, a first cooler opening and a second cooler opening;
the first cooler opening fluidically connected with the second pump opening;
the second cooler opening fluidically connected with the outlet opening;
wherein the conveyor is arranged on the back side and fluidically connected with the plurality of pump openings such that the flow path extends between the inlet opening and the conveyor and between the conveyor and the first cooler opening;
wherein the heat exchanger is arranged on the back side and fluidically connected with the first cooler opening and the second cooler opening such that the flow path extends through the heat exchanger between the first cooler opening and the second cooler opening and between the second cooler opening and the outlet opening;
wherein the front side faces the motor;
wherein the motor further includes an oil inlet for letting the oil into the motor and an oil outlet for letting the oil out of the motor, the oil inlet and the oil outlet facing the front side; and
wherein the oil outlet is fluidically connected with the inlet opening and the oil inlet is fluidically connected with the outlet opening such that the flow path extends through the motor.

17. The system according to claim 16, wherein the motor is an electric motor.

18. The system according to claim 16, wherein:
the main body further includes a base plate having a base plate front side and a base plate back side, the base plate front side at least partially defining the front side of the main body, the base plate back side at least partially defining the back side of the main body;
the main body further includes an ancillary plate having an ancillary plate front side and an ancillary plate back side, the ancillary plate front side at least partially defining the front side of the main body, the ancillary plate back side at least partially defining the back side of the main body; and
the base plate and the ancillary plate are connected to one another in a step-like manner such that the base plate and the ancillary plate are disposed offset from one another.

19. An oil module, comprising:
a conveyor configured to convey oil along a flow path;

a heat exchanger configured to temperature-control the oil, the flow path extending through the heat exchanger;

a main body having a front side surface and a back side surface facing away from the front side surface, the main body including:
- a base plate having a base plate front side surface and a base plate back side surface, the base plate front side surface at least partially defining the front side surface of the main body, the base plate back side surface at least partially defining the back side surface of the main body;
- an ancillary plate having an ancillary plate front side surface and an ancillary plate back side surface, the ancillary plate front side surface at least partially defining the front side surface of the main body, the ancillary plate back side surface at least partially defining the back side surface of the main body;
- an inlet opening disposed in the ancillary plate front side surface via which the oil is flowable into the main body;
- an outlet opening disposed in the front side surface of the main body via which the oil is flowable out of the main body;
- at least one pump opening disposed in the ancillary plate back side surface, the at least one pump opening fluidically connected with the inlet opening;
- a first cooler opening disposed in the base plate back side surface, the first cooler opening fluidically connected with the at least one pump opening; and
- a second cooler opening disposed in the base plate back side surface, the second cooler opening fluidically connected with the outlet opening;

wherein the conveyor is arranged on the back side surface of the main body and fluidically connected with the at least one pump opening such that the flow path extends between the inlet opening and the conveyor and between the conveyor and the first cooler opening; and wherein the heat exchanger is arranged on the back side surface of the main body and fluidically connected with the first cooler opening and the second cooler opening such that the flow path extends through the heat exchanger between the first cooler opening and the second cooler opening and between the second cooler opening and the outlet opening.

20. The oil module according to claim 19, wherein the base plate and the ancillary plate are connected to one another in a step-like manner such that the base plate and the ancillary plate are disposed offset from one another in a direction extending transversely to the front side surface and the back side surface of the main body.

* * * * *